United States Patent

Mason et al.

[15] 3,689,825
[45] Sept. 5, 1972

[54] INVERTER DRIVE CIRCUIT

[72] Inventors: Edwin E. Mason, Harrisburg; Ross C. Libby, West Jefferson, both of Ohio

[73] Assignee: Design Elements, Inc.,

[22] Filed: Sept. 27, 1971

[21] Appl. No.: 183,995

[52] U.S. Cl. .............................321/45 R, 331/113 A
[51] Int. Cl. ................................................H02m 7/52
[58] Field of Search................321/18, 45; 331/113 A

[56] References Cited

UNITED STATES PATENTS

| | | | |
|---|---|---|---|
| 2,950,446 | 8/1960 | Humez et al. | 331/113 A |
| 3,004,206 | 10/1961 | Sheffet | 331/113 A |
| 3,151,287 | 9/1964 | Pintell | 321/45 R |
| 3,305,760 | 2/1967 | Davis et al. | 321/45 R |
| 3,448,370 | 6/1969 | Harrigan | 321/45 R |
| 3,467,852 | 9/1969 | Murray et al. | 321/45 R |

*Primary Examiner*—William M. Shoop, Jr.
*Attorney*—Cennamo, Kremblas & Foster

[57] ABSTRACT

In a voltage feedback, one transformer, transistor inverter circuit, an improved drive circuit having a first resistor connected between the center tap of the base circuit winding and the center tap of the collector circuit winding and having a series first bipolar junction transistor and second resistor connected between the center tap of the base winding and the interconnected common emitter terminals of a push-pull connected pair of transistors. The first resistor has a substantially greater resistance than the second resistor and the first transistor is polarized to permit base current to flow around the base circuit loops. The first transistor is switched by a pair of diodes connected between its base and the opposite ends of the base circuit winding. Base current is limited by a series connected pair of diodes connected between the base and said interconnected common emitter terminals of the push-pull transistors.

7 Claims, 2 Drawing Figures

3,689,825

INVERTER DRIVE CIRCUIT

BACKGROUND OF THE INVENTION

This invention relates to dc to ac inverter circuits and more particularly relates to an improved starting and drive circuit for use in such an inverter. It is an improvement over the inverter starting circuit described in copending application Ser. No. 101,503, filed Dec. 28, 1970.

In power supply circuitry, it is often necessary to convert a dc-voltage of one magnitude to a dc-voltage at another or several other magnitudes. One conventional manner to accomplish this purpose is to utilize an inverter which converts a dc-voltage to an ac-voltage. Subsequent rectification of the transformer coupled inverter ac energy results in the desired dc to dc conversion. Commonly, inverter circuits are free-running oscillators utilizing a saturable transformer. The saturable transformer includes a center tapped output circuit winding coupled to a center tapped input circuit winding. A pair of push-pull connected transistors are connected to these windings so that their output circuits alternately drive the transformer to saturation in opposite direction.

A common problem with inverter circuits is that, although in steady state operation they are excellent oscillators, they are balanced circuits when they are initially energized. THerefore, without a proper starting circuit, an inverter will not itself begin oscillation.

Many starting circuits have been suggested in the prior art. Typical ones are illustrated in the semi-conductor power circuits handbook, published by Motorola Incorporated, first edition, November 1968. The goal of a starting circuit is to provide reliable and quick starting of the oscillations of the inverter and then to assure continued oscillation of the inverter with a minimum consumption of power. The primary advantage of the starting circuit disclosed herein is that it not only provides fast, reliable starting, continued oscillation, and improved power dissipation characteristics but also it permits a reduced input drive voltage at the input transformer winding and therefore reduced the reverse voltage applied to the inputs of the push-pull transistors.

SUMMARY OF THE INVENTION

The invention is an improved drive circuit for use in an inverter of the type having at least two magnetically coupled center tapped windings and a pair of push-pull connected active elements connected for free running oscillation. The active elements have their input terminals connected to opposite sides of one of the windings and their output terminals connected to opposite sides of the other of the windings. The active elements also have interconnected common terminals. The improved drive circuit has a first resistance connected between the center taps of the windings. A series connected electronic switch means and second resistance is connected between the center tap of the input one of the windings and the common terminal of the active elements. The switch means is polarized to permit current flow around the input circuit loop comprising the second resistance, the switch means, the input winding and an input terminal of the active elements.

The circuit is improved with a series connected pair of base current limiting diodes between the base of the switch means and the common terminal of the active elements.

It is an object of the invention to provide an inverter starting circuit which assures fast initiation of the oscillations in the inverter and yet minimizes wasteful power consumption by the starting circuit.

Another object of the invention is to provide a starting circuit with the above characteristics and yet which is inexpensive.

Another object of the invention is to limit the base current of the transistor which drives the push-pull connected transistors.

Another object of the invention is to provide an inverter starting circuit with improved power efficiency.

Yet another object of the invention is to reduce the reverse voltage applied to the inputs of the push-pull connected transistors.

Further objects and features of the invention will be apparent from the following specification and claims when considered in connection with the accompanying drawings illustrating the preferred embodiment of the invention.

Figures 1, 2:
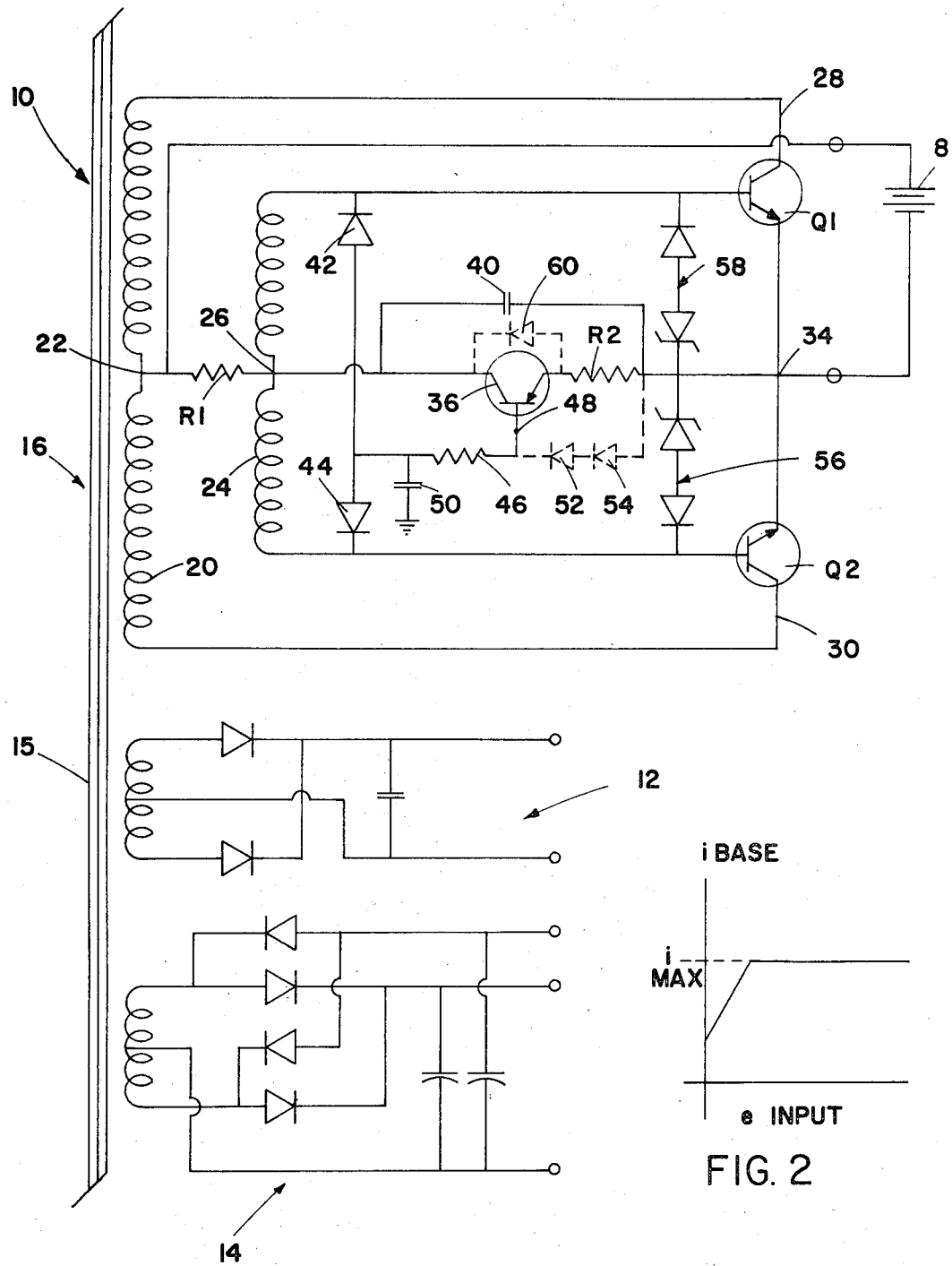
FIG. 1 is a schematic diagram illustrating the improved drive circuit of the invention utilized in an inverter and which in turn may be utilized in a dc to dc converter circuit.
FIG. 2 is graph illustrating the operation of the base current limiting circuit.

In describing the preferred embodiment of the invention illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose. For example, the word "connected" includes connection through conductors and through circuit elements where such connection would be equivalent in relationship to the principles of the invention.

DETAILED DESCRIPTION

The circuit of FIG. 1, is a dc to dc converter deriving its power from a dc voltage source 8 which is to be converted to an ac voltage by the inverter circuit 10. The ac output power from the inverter 10 is coupled to a first rectifier 12 and to a second rectifier 14 by magnetic coupling through the common core 15 of the transformer 16. The rectifiers 12 and 14 are ordinary diode rectifier and filters.

The inverter 10 has an output winding 20 with a center tap 22. An input circuit winding 24 is magnetically coupled to the output circuit winding 20 and has a center tap 26. A pair of push-pull connected transistors $Q_1$ and $Q_2$ are connected to these windings 20 and 24 for free running oscillation. The transistors $Q_1$ and $Q_2$ are active elements having their input terminals connected to opposite sides of the input circuit winding 24. Their output terminals at their collectors 28 and 30 are connected to opposite sides of the output circuit winding 20. The transistors $Q_1$ and $Q_2$ are connected in a common emitter configuration so that their emitters are interconnected at a common terminal 34. Input dc energy is applied to the inverter circuit from the dc source 8 which is connected to the common terminal 34 and to the center tap 22 of the input circuit winding 20.

The improved starting circuit has a first resistor $R_1$, connected from the center tap 22 of the output winding 20 to the center tap 26 of the input circuit winding 24. A series connected bipolar junction transistor 36 and second resistor $R_2$ are connected between the center tap 26 of the input circuit winding and the common terminal 34 of the transistors $Q_1$ and $Q_2$. The transistor is a switching means and is polarized to permit base to emitter current to flow around the circuit loop comprising the second resistance $R_2$, the transistor 36, and one half of the input circuit winding 24. A speed up and filter capacitor 40 is connected between the center tap 26 of the input circuit winding 24 and the common terminal 34 of the transistors $Q_1$ and $Q_2$.

The transistor 36 controls the application of current to the bases of the push-pull connected transistors $Q_1$ and $Q_2$ in a manner described below. It is switched by a pair of diodes 42 and 44 which are connected through a current limiting resistor 46 between the base 48 of the transistor 36 and the opposite ends of the input circuit winding 24. A capacitor 50 is connected between the diodes 42 and 44 and ground for filtering high frequency transients or spikes which occur during oscillation and for smoothing the base drive current.

A series connected pair of base current limiting diodes 52 and 54 are connected between the base terminal 48 of transistor 36 and the common terminal 34 of the push-pull connected transistors $Q_1$ and $Q_2$. These diode pairs 56 and 58 help clip any reverse voltages applied to the bases of the transistors $Q_1$ and $Q_2$.

As an alternative improvement, another diode 60 may be connected parallel to the switching transistor 36. This diode 60 will help assure the existence of a forward, input circuit current should the switching transistor 36 not yet be switched on by its base current.

It is important to note that the value of $R_1$ may advantageously be made relatively large and the value of $R_2$ may advantageously be small. For example, with a 200 volt source 8, the value of $R_1$ may be 100K ohms and the value of $R_2$ may be 8.2 ohms. These values help the circuit to assure starting of the oscillations while minimizing power consumption during steady state oscillation of the inverter.

The operation of the circuit is preceded by complete de-energization of the entire circuit illustrated in FIG. 1. Operation is then initiated by the application of power to the inverter circuit from the dc voltage of, for example, 100 volts is applied to the center tap 22 of the output circuit winding 20. At this beginning instant, the collector of the transistor 36 is improperly biased so that no substantial current can flow through the resistor $R_2$. If diode 60 is used, it too is reverse biased. If the transistor 36 were not present, most of the current flowing through the resistance $R_1$ would flow likewise through the resistor $R_3$ and not aid in the starting of the circuit because $R_2$ is intentionally made small for efficient steady state operation. However, because of the presence of non-conducting transistor 36, the majority of the current flowing from the dc source 8 and through the resistance $R_1$ will flow through the base to emitter junctions of the transistors $Q_1$ and $Q_2$. Therefore, an important feature of this starting and drive circuit is that substantially all of the initial current applied to the circuit is applied to the transistors for starting purposes. Nearly none is wastefully dissipated in other resistors. If a majority of the current flowed through $R_2$, clearly a much higher starting current from the source 32 would be required to initiate conduction of transistor $Q_1$ or $Q_2$. The circuit will therefore begin oscillations quickly because substantially all starting current is applied to the emitter-base junctions to bring transistor $Q_1$ or $Q_1$ rapidly into conduction.

Whichever of the transistors $Q_1$ or $Q_2$ has the highest forward current transfer ratio will predominate and its collector circuit will begin driving the transformer windings 20 to drive the transformer 16 toward saturation. The resulting change of flux density in the transformer 16 will cause energy to be coupled to the input circuit transformer 24 which will be of a polarity to increase the conduction to the predominate transistor while cutting off the other transistor. In addition, the voltage induced on the input transformer 24 will apply current to the base 48 of transistor 36 through either the diode 42 or diode 44, depending on the induced polarity. The induced voltage carries emitter base current through $Q_1$ and $Q_2$ which will also properly bias the collector of transistor 36 so that the transistor 36 will be switched on.

For example, if transistor $Q_1$ initially begins greater conduction, its collector current will predominate and begin driving the transformer 16 toward saturation. The voltage thereby coupled onto the input circuit winding 24 will saturate the transistor $Q_1$, turn on transistor 36 with current through diode 44 while cutting off the transistor $Q_2$.

When the collector current of transistor $Q_1$ approaches the saturation current for the transformer 16 on its hysteresis curve, the rate of flux change will decrease, thereby decreasing the voltage supplying current to the base emitter junction of the transistor $Q_1$. This will result in a reduced current through the output winding 20 of the transformer and in the base of the transistor $Q_1$ and eventually the transistor $Q_1$ will cease conducting.

The magnetic field of the transformer 16 will then collapse and will induce a voltage on the input circuit winding 24 in an opposite polarity. This induced voltage from the collapsing magnetic field will bring transistor $Q_2$ into conduction and cut off transistor $Q_1$. Transistor 36 will be switched on by current through diode 42. Eventually, capacitor 50 will charge to a d-c level maintaining transistor 36 switched on. This will result in an increased collector current in the transistor $Q_2$ and eventually saturation of the transformer 16 in the opposite direction. Transistor $Q_2$ will then cease conducting in the manner described above in connection with transistor in the manner described above in connection with transistor $Q_1$ and the cycle continues to repeat itself in opposite directions.

With oscillation occurring in the steady state, base current to the transistors is supplied entirely from the input circuit winding 24. In this oscillating condition the collector of the transistor 36 is properly biased and base to emitter junction current for the push-pull transistors $Q_1$ and $Q_2$ flows around a loop comprising the second resistance $R_2$, the transistor 36, and the saturated transistor's half of the circuit winding 24.

Because the resistor $R_1$ has a high resistance, very little current flows through it during oscillation and therefore very little power is wastefully dissipated in the resistor $R_1$. Furthermore, because the value of $R_2$ is made substantially small, base current for saturating the transistors is easily maintained without substantial power dissipation in the small resistance of $R_2$. Therefore, during steady state oscillation of the circuit neither the resistor $R_1$ nor the resistor $R_2$ dissipates considerable energy and therefore the circuit operates at a high efficiency. Heat generation is kept to a minimum. If base current were not supplied by the output circuit winding 24 and the rectifier action of the base to emitter junction of each transistor, then biasing energy during oscillation would have to be supplied by a current flowing through the resistor $R_1$. This would means that resistor $R_1$ would dissipate considerable energy and greatly reduce the circuit efficiency. Since $R_1$ does not conduct biasing current during oscillation it can be made higher than it otherwise would need to be.

During each half cycle of operation, a reverse voltage is applied to $Q_1$ or $Q_2$ to turn them on. The forward voltage is determined in designing the circuit by the voltage necessary to turn them on but in operation, the forward voltage fluctuates where the inverter is used over a wide range of load conditions. Any change which reduces the voltage necessary at the input winding 24 to turn on $Q_1$ and $Q_2$ will reduce the reverse voltage applied to the base of $Q_1$ and $Q_2$. In fact, a reduction of the forward voltage requirement by 0.5 volt reduces the reverse voltage by 1 volt.

In the circuit described in the above identified copending patent application, a diode was connected where the alternative diode 60 is illustrated in FIG. 1. The transistor 36 and its base circuit was absent.

By substituting the transistor 36, with its characteristic emitter to collector drop at saturation of approximately 0.1 volt for a diode with its characteristic forward voltage drop of 0.6, we have reduced the voltage drop around the input circuit loop of transistors $Q_1$ and $Q_2$ by 0.5 volts, when diodes 52, 54, described below, are not conducting.

This means that 0.5 volt less is required across each half of the input winding 24. It also means the 0.5 less is stored on the capacitor 40 and is dropped across transistor 36, and $R_2$. Therefore, the reverse voltage at the base of $Q_1$ and $Q_2$ which is the sum of the voltage on half the input winding 24 and across the transistor 36, will be reduced by 1 volt. Since 5 volts represents the ordinary reverse base voltage permitted, this represents at least a 20 percent reduction. In fact, the bases are not usually driven this hard. The circuit will ordinarily permit a voltage reduction from around 2.5 volts to 1.5 volts which represents a 40 percent reduction.

The diodes 42 and 44 provide an extra benefit above switching of the transistor 36. Because they supply base current, they conduct only small currents. Therefore diodes may be used which have a very fast rise time. They can therefore clip the very high frequency reverse spikes on the input winding 24 and thereby help protect transistors $Q_1$ and $Q_2$.

The diode 60, of FIG. 1, may alternatively be added in parallel to transistor 36 to assure transition from starting conditions to state.

The diodes 52 and 54 shown in phantom in FIG. 1, may alternatively be added to provide a constant current clamp or limiter for the base current of the transistor 36. All current flowing through the resistor 46 will flow through the base-emitter junction of transistor 36 so long as the sum of the base-emitter voltage drop plus the voltage drop across $R_2$ is less than the sum of the forward junction voltages necessary for the diodes 52 and 54 to begin conducting (the voltages to break down the junction potential barriers). For silicon rectifiers and transistors, this minimum forward junction voltage for forward current is approximately 0.6 volts at 25°C. (0.3 volts for germanium).

Therefore $R_2$ can be chosen so its voltage drop will be 0.6 volts at the maximum base current, $i_{max}$ in FIG. 2, which will be permitted in the base of transistor 36. The initially small base current in transistor 36 will increase toward $2_{max}$ and will be substantially all the current through resistor 46.

With proper design, when $i_{max}$ is reached, the voltage across $R_2$ will be 0.6 and the diodes 52 and 54 will begin conducting. Base current will remain at $i_{max}$ and all additional current through resistor 46 will be shunted around transistor 36 and through the diodes 52 and 54. However, for an ordinary minimum reverse potential to $Q_1$ and $Q_2$ these diodes 52 and 54 are unnecessary and we prefer to avoid them at our intended operating levels.

It is to be understood that while the detailed drawing and specific examples given describe preferred embodiment of the invention, they are for the purposes of illustration only that the apparatus of the invention is not limited to the precise details and conditions disclosed and that various changes may be made therein without departing from the spirit of the invention which is defined by the following claims.

I claim:

1. In an inverter of the type having at least two magnetically coupled, center tapped windings and a pair of push-pull connected active elements connected for free running oscillation, the active elements having their input terminals coupled to opposite sides of an input one of said windings and their output terminals connected to opposite sides of the other of said windings, an improved drive circuit comprising:

a. a first resistance connected between the center taps of said windings;

b. a series connected second resistance and an electronic switch means connected between the center tap of the input one of said windings and the common terminals of said active elements, said switch means having a control input terminal and being connected in a polarity to permit current flow around an input circuit loop comprising said switch means, said second resistance, said input winding and the input of one of said active elements; and c. a pair of diodes connected between the control input terminal of said switch means and opposite ends of one of said windings, said diodes polarized to permit actuation of said switch means.

2. An inverter drive circuit according to claim 1 wherein said switch means is a first bipolar junction transistor connected in a common emitter configuration having its base connected to said diodes and said diodes connected to opposite sides of the input one of said windings.

3. A circuit according to claim 2 wherein a current limiting resistance is interposed in series with said diodes.

4. A circuit according to claim 2 wherein a current limiting resistance is interposed in series with said diodes, and wherein a filter capacitance is connected parallel to said series second resistance and switch means and another filter capacitance is connected between said diodes and a ground terminal.

5. A circuit according to claim 4 wherein said first resistance is substantially greater than said second resistance.

6. A circuit according to claim 2 wherein said second resistance has one terminal connected to the emitter of said first transistor and a pair of series connected, base current limiting diodes are connected between the other terminal of said resistance, and the base of said transistor.

7. A circuit according to claim 2 wherein
said active elements are second and third bipolar junction transistors and said first transistor is polarized to permit current flow around the input circuit loops of and through the base-emitter junctions of said second and third transistors.

* * * * *